(12) United States Patent
Tsai et al.

(10) Patent No.: US 6,980,724 B2
(45) Date of Patent: Dec. 27, 2005

(54) MONITORING POWER IN OPTICAL NETWORKS

(75) Inventors: Tsung-Ein Tsai, San Jose, CA (US); Gabel Chong, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/367,267

(22) Filed: Feb. 15, 2003

(65) Prior Publication Data

US 2004/0160597 A1 Aug. 19, 2004

(51) Int. Cl.[7] ................................. G02B 6/10
(52) U.S. Cl. ...................................... 385/129
(58) Field of Search .............. 385/122–132, 385/12, 14, 49, 88–94

(56) References Cited

U.S. PATENT DOCUMENTS

| | | | |
|---|---|---|---|
| 5,384,872 A | * | 1/1995 | Jacobs-Cook et al. ........ 385/31 |
| 6,243,524 B1 | | 6/2001 | Funabashi |
| 6,456,766 B1 | | 9/2002 | Shaw et al. |
| 6,530,698 B1 | * | 3/2003 | Kuhara et al. ................. 385/88 |
| 6,567,590 B1 | * | 5/2003 | Okada et al. .................. 385/49 |
| 6,714,696 B2 | * | 3/2004 | Kishimoto et al. ........... 385/14 |

OTHER PUBLICATIONS

Skinner et al., U.S. Appl. No. 10/329,252 entitled "Waveguides with Optical Monitoring" filed De. 24, 2002.

* cited by examiner

Primary Examiner—Tu T. Nguyen
(74) Attorney, Agent, or Firm—Trop, Pruner & Hu, P.C.

(57) ABSTRACT

An optical network may include a detector for detecting the power of each of a plurality of channels of a wavelength division multiplexed optical signal in one embodiment of the present invention. Each channel may be conveyed to an interface underneath a detector by way of a core formed in the substrate. The interface may include a trench with one side surface angled to form a reflector to reflect light upwardly to be detected by the detector. Other surfaces of said trench may also be reflective to reduce the cross talk between adjacent channels.

14 Claims, 2 Drawing Sheets

MONITORING POWER IN OPTICAL NETWORKS

BACKGROUND

This invention relates generally to planar light circuits.

A planar light circuit is an optical circuit that uses integrated waveguides. These waveguides may be integrated into a substrate that, in some embodiments, may be an integrated circuit substrate. The planar light circuit may be formed using techniques that are known in forming integrated circuits.

Commonly it is desired to monitor the power in each channel in a planar light circuit. For example, in wavelength division multiplexed networks, a large number of channels, each with a different wavelength, may be multiplexed together. It is important to know the power of each channel since each channel may be ultimately separated, at its intended destination, from the multiplexed signal.

Existing circuits for monitoring power using planar light circuits are subject to cross talk between adjacently positioned detectors for different channels. Cross talk is any distortion of one channel caused by another channel.

Thus, there is a need for better ways to monitor power in planar light circuits.

DETAILED DESCRIPTION

Figure 1:
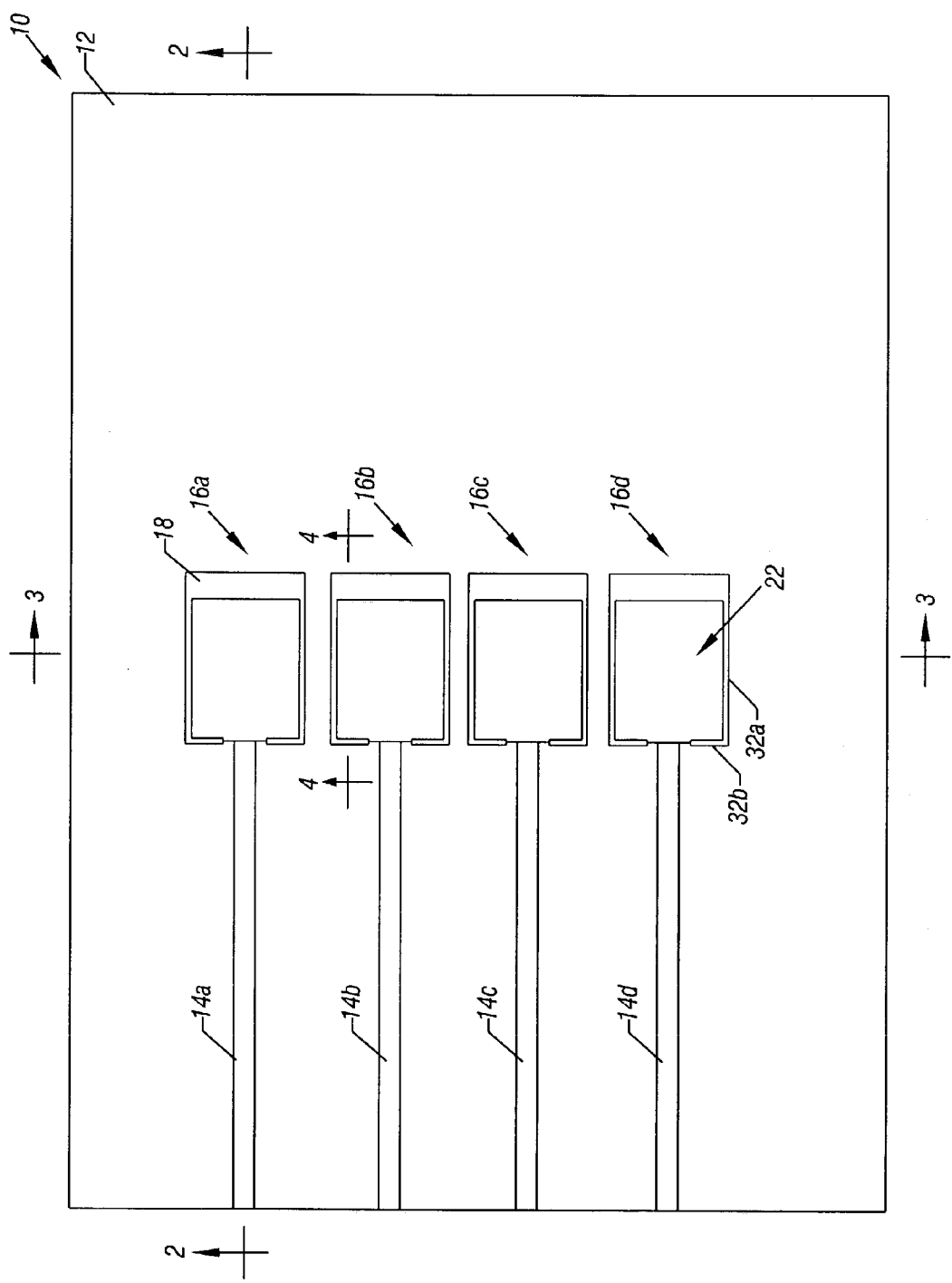
FIG. 1 is a top plan view of one embodiment of the present invention without the power detector array.

Referring to FIG. 1, a planar light circuit 10 may include a substrate 12 which, in one embodiment, may be formed of silicon, but other substrate materials may be used as well. A plurality of cores 14a through 14d may extend inwardly from one edge of the substrate 12. Each core 14 may carry a signal associated with one channel of a wavelength division multiplexed signal. Each core 14 may be coupled to an interface 16 that interfaces the cores 14 with a power monitor array not shown in FIG. 1.

Each interface 16 may include a trench 22 which is surrounded by reflective edges 32a and 32b and by angled reflector 18. The reflector 18 deflects incident light from a core 14 upwardly to be detected by an overlying power detector.

Figure 2:
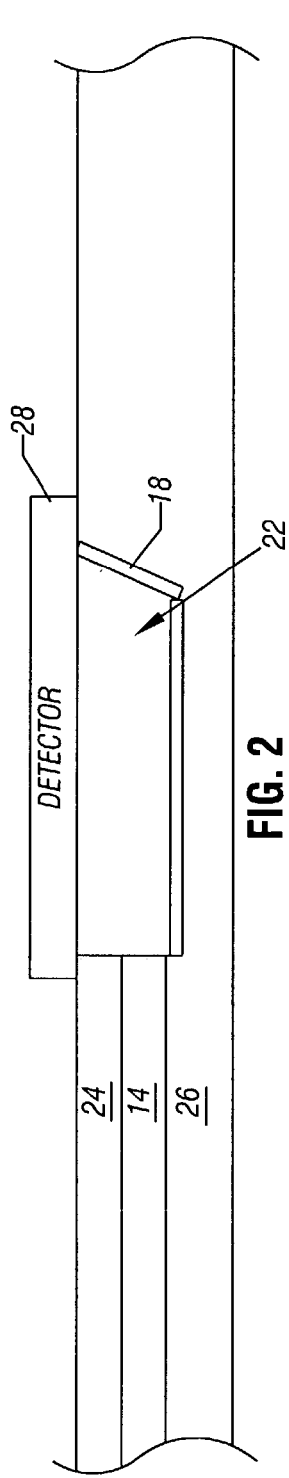
FIG. 2 is an enlarged cross-sectional view taken generally along the line 2—2 in FIG. 1.

Referring to FIG. 2, the substrate 12 may define the core 14 and an upper cladding 24 as well as a lower cladding 26. The core 14 ends at a trench 22. Thus, light incident on the substrate 12 passes through the core 14 to be reflected from the reflector 18 to travel upwardly to be detected by the detector 28.

Figure 3:
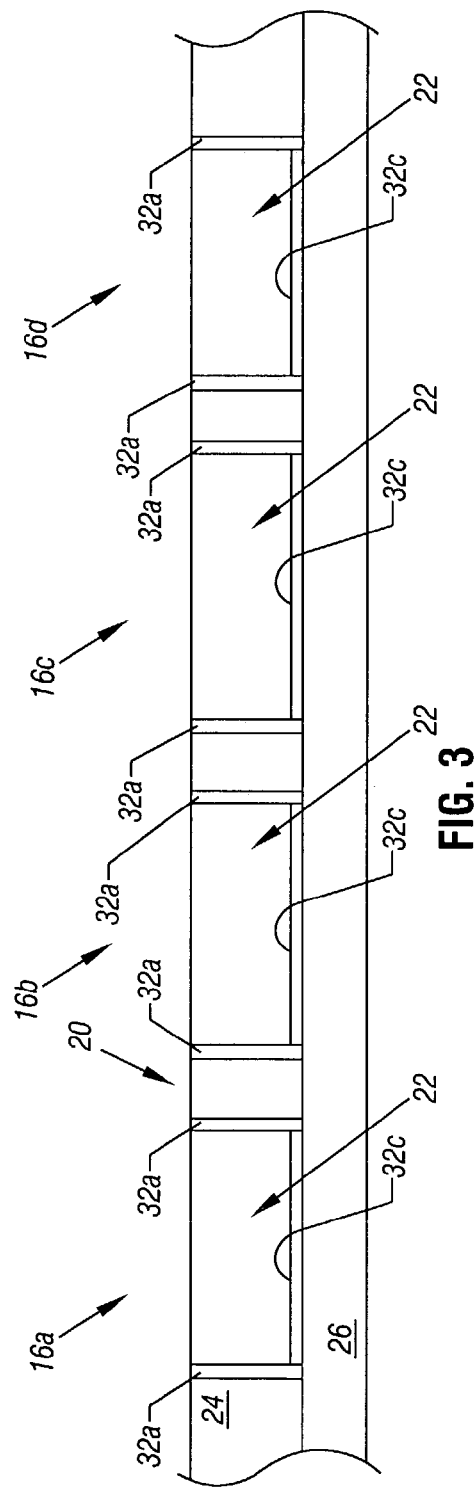
FIG. 3 is an enlarged cross-sectional view taken generally along the line 3—3 in FIG. 1.

Referring to FIG. 3, each interface 16 may include a trench 22 with side walls 32a that are coated with a reflective material. In some embodiments, the bottom surface 32c may also be reflective.

As a result, any stray light is ultimately reflected up to the detector 28 and cross talk from adjacent interfaces 16 is reduced. As shown in FIG. 1, each interface 16 is separated from adjacent interfaces by a cladding 24 that serves to optically isolate one channel from physically adjacent channels.

Figure 4:
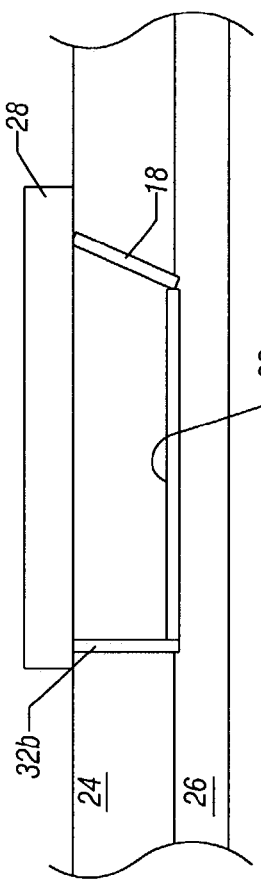
FIG. 4 is an enlarged cross-sectional view taken generally along the line 4—4 in FIG. 1.

Finally, referring to FIG. 4, the surface 32c, the side walls 32b and 32a, and the reflector 18 define a lined cavity 22 which deflects light upwardly to the detector 28. The reflective surfaces 32 may eliminate or reduce cross talk between physically adjacent channels.

In accordance with one embodiment of the present invention, the trench 22 may be formed and the side walls 32a, 32b, and bottom 32c of the trench 22 may be coated with a surrounding metal reflective layer. Suitable reflective materials include aluminum, gold, and silver. If gold or silver is utilized, it may be desirable to provide an undercoating to isolate the substrate 26 from the silver material.

In some embodiments it may be desirable to coat the entire cavity 22 with reflective material except for the regions close to the core 14. Only light from the core 14 can then reach the assigned trench 22 and, thus, light guided in the two-dimensional cladding region can hardly enter the nearest neighboring waveguide core. In this way, cross talk can be reduced. Also, any light from any given individual channel will be reflected within the trench cavity 22 and will eventually be captured by the assigned detector. Thus, by using surrounding reflectors, substantially all the light within the trench is detected by the detector in some embodiments. Thus, some embodiments may exhibit improved efficiency with less cross talk.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An optical device comprising:
   a substrate;
   a plurality of optical cores in said substrate;
   a plurality of trenches in said substrate, each trench optically coupled to one of a plurality of cores, each trench including a side wall, a bottom, and a reflector;
   a power detector over each of said trenches to receive light from a core reflected by a reflector;
   each of said side walls having a reflective coating; and
   cladding between said trenches.

2. The device of claim 1 wherein said trench includes a pair of opposed, reflective side walls.

3. The device of claim 1 wherein said trench includes a wall opposite said reflector, said core coupled to said trench through said opposite wall, said opposite wall including a reflective coating.

4. The device of claim 1 wherein said trench is substantially completely reflective.

5. The device of claim 1 wherein said substrate forms a planar light circuit.

6. A method comprising:
   forming a plurality of trenches in a substrate, said trenches having a bottom and four side walls;
   forming a plurality of cores within said substrate, each core to enter one of said trenches through a first side wall of said trench to optically couple to said trench;

forming an angled reflector on a fourth side wall of each trench to reflect light from said core; and providing cladding between said trenches.

7. The method of claim 6 wherein forming a trench in a substrate includes forming a trench having two opposed side walls and lining said opposed side walls with a reflective material.

8. The method of claim 6 including leaving a region of said first side wall with said core free of reflective material.

9. The method of claim 6 including lining the bottom of said trench with reflective material.

10. The method of claim 6 including covering said first side wall through which said core enters said trench with a reflective material.

11. The method of claim 6 including providing a power detector on the surface of said substrate to receive the light reflected out of said substrate by said reflector.

12. The method of claim 11 wherein providing a power detector includes providing a power detector that spans the length of said trench, from said first side wall to said fourth side wall.

13. The method of claim 6 including forming a planar light circuit including said trench.

14. The method of claim 6 including adapting said trench to reduce cross talk.

* * * * *